(12) United States Patent
Boyle et al.

(10) Patent No.: US 7,912,844 B2
(45) Date of Patent: *Mar. 22, 2011

(54) SYSTEM FOR NAVIGATING BEANS USING FILTERS AND CONTAINER MANAGED RELATIONSHIPS

(75) Inventors: Alan Iain Boyle, Eastleigh (GB);
Geoffrey M. Hambrick, Round Rock, TX (US); Martin J. Smithson, Winchester (GB); Sridhar Sudarsan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 214 days.

This patent is subject to a terminal disclaimer.

(21) Appl. No.: 12/262,256

(22) Filed: Oct. 31, 2008

(65) Prior Publication Data
US 2009/0064093 A1 Mar. 5, 2009

Related U.S. Application Data

(63) Continuation of application No. 11/201,656, filed on Aug. 11, 2005, now Pat. No. 7,480,666.

(51) Int. Cl.
*G06F 7/00* (2006.01)
*G06F 17/30* (2006.01)

(52) U.S. Cl. ............ 707/754; 707/805; 707/812
(58) Field of Classification Search .......... None
See application file for complete search history.

(56) References Cited

U.S. PATENT DOCUMENTS

| | | | |
|---|---|---|---|
| 6,321,229 B1 * | 11/2001 | Goldman et al. | 1/1 |
| 2003/0036919 A1 | 2/2003 | Felt et al. | |
| 2004/0111701 A1 * | 6/2004 | Beust | 717/108 |
| 2005/0002500 A1 * | 1/2005 | Kumai | 379/88.17 |
| 2005/0005200 A1 | 1/2005 | Matena et al. | |
| 2005/0120101 A1 * | 6/2005 | Nocera | 709/223 |

OTHER PUBLICATIONS

Berg, Daniel, "EJB development made easy using the UML Visualizer in WebSphere Studio", IBM Corporation, Oct. 6, 2004, http://www-128.ibm.com/developerworks/websphere/library/techarticles/0410_berg/0410_..., pp. 1-30.
Fogleson, Allen, "Container-managed relations for the 21st century", JavaWorld, Apr. 19, 2002, http://vpmv.javaworld.com/javaworld/jw-04-2002/jw-0419-cmp_p.html, pp. 1-12.

* cited by examiner

*Primary Examiner* — Cam Y T Truong
(74) *Attorney, Agent, or Firm* — Francis Lammas; Stephen J. Walder, Jr.; David A. Mims, Jr.

(57) ABSTRACT

A system for navigating relationships between beans using filters and container managed relationships is provided. With the system, filters are specified in the relationship definition of a deployment descriptor of a bean. The filters generate additional predicates to the WHERE clauses in SQL SELECT statements generated based on the contents of the deployment descriptor. Moreover, these filters may be defined such that method parameters may be passed into the resulting deployed code to thereby make them more flexible. Therefore, with the system, rather than defining filters programmatically in methods of a bean's implementation class, filters are defined declaratively in the deployment descriptor of the bean. Since these filters are specified in the deployment descriptor of the bean, they are accessible to clients of the bean through the local interface.

10 Claims, 9 Drawing Sheets

```
<relationships>
    <ejb-relation>
        <ejb-relation-name>Employee_To_Department</ejb-relation-name>
        <ejb-relationship-role id="EJBRelationshipRole_1118073727887">
            <ejb-relationship-role-name>department</ejb-relationship-role-name>
            <multiplicity>Many</multiplicity>
            <relationship-role-source>
                <ejb-name>Employee</ejb-name>
            </relationship-role-source>
            <cmr-field>
                <cmr-field-name>department</cmr-field-name>
            </cmr-field>
        </ejb-relationship-role>
        <ejb-relationship-role id="EJBRelationshipRole_1118073727897">
            <ejb-relationship-role-name>employeesBySex</ejb-relationship-role-name>
            <multiplicity>One</multiplicity>
            <relationship-role-source>
                <ejb-name>Department</ejb-name>
            </relationship-role-source>
            <cmr-field>
                <cmr-field-name>employeesBySex</cmr-field-name>
                <cmr-field-type>java.util.Collection</cmr-field-type>
            </cmr-field>
            <ejb-filter>
                <method-params>java.lang.Character</method-params>
                <ejb-ql>
                    Employee.sex = ?1
                </ejb-ql>
            </ejb-filter>
        </ejb-relationship-role>
    </ejb-relation>
</relationships>
```

910 (brace covering upper portion), 920 (brace covering ejb-filter block)

*FIG. 1*

```xml
.
.
.
<relationships>
  <ejb-relation>
    <ejb-relation-name>User-Demographics</ejb-relation-name>
    <ejb-relationship-role>
      <ejb-relationship-role-name>User-Demographics</ejb-relationship-role-name>
      <multiplicity>One</multiplicity>
      <relationship-role-source>
        <ejb-name>Users</ejb-name>
      </relationship-role-source>
      <cmr-field>
        <cmr-field-name>demographics</cmr-field-name>
      </cmr-field>
    </ejb-relationship-role>
    <ejb-relationship-role>
      <ejb-relationship-role-name>Demographics-belongs-to-Users</ejb-relationship-role-name>
      <multiplicity>One</multiplicity>
      <cascade-delete/>
      <relationship-role-source>
        <ejb-name>Demographics</ejb-name>
      </relationship-role-source>
    </ejb-relationship-role>
  </ejb-relation>
</relationships>
.
.
.
```

FIG. 4B
```
SELECT
        T1. EMPNO,
        T1. FIRSTNME,
        T1. MIDINIT,
        T1. LASTNAME,
        T1. PHONENO,
        T1. HIREDATE,
        T1. JOB,
        T1. EDLEVEL,
        T1. SEX,
        T1. BIRTHDATE,
        T1. SALARY,
        T1. BONUS,
        T1. COMM,
        T1. WORKDEPT
FROM
        EMPLOYEE T1
WHERE
        T1.WORKDEPT = ?
```

FIG. 5
```
<query>
    <description></description>
    <query-method>
        <method-name>findMaleEmployees</method-name>
        <method-params>
        </method-params>
    </query-method>
    <ejb-ql>
        select object (o) from Department o, in(o.employees) 1 where 1.sex = 'M'
    </ejb-ql>
</query>
```

*FIG. 6*

```
<query>
    <description></description>
    <query-method>
        <method-name>ejbSelectMaleEmployees</method-name>
        <method-params>
            <method-param>java.lang.String</method-param>
        </method-params>
    </query-method>
    <ejb-ql>select object (1) from Department o, in(o.employees)
1 where 1.department.deptno=?1 and 1.sex = 'M'</ejb-ql>
</query>
```

*FIG. 7*

```
<relationships>
    <ejb-relation>
        <ejb-relation-name>Employee_To_Department</ejb-relation-name>
        <ejb-relationship-role id="EJBRelationshipRole_1118073727887">
            <ejb-relationship-role-name>department</ejb-relationship-role-name>
            <multiplicity>Many</multiplicity>
            <relationship-role-source>
                <ejb-name>Employee</ejb-name>
            </relationship-role-source>
            <cmr-field>
                <cmr-field-name>department</cmr-field-name>
            </cmr-field>
        </ejb-relationship-role>
        <ejb-relationship-role id="EJBRelationshipRole_1118073727897">
            <ejb-relationship-role-name>maleEmployees</ejb-relationship-role-name>
            <multiplicity>One</multiplicity>
            <relationship-role-source>
                <ejb-name>Department</ejb-name>
            </relationship-role-source>
            <cmr-field>
                <cmr-field-name>employees</cmr-field-name>
                <cmr-field-type>java.util.Collection</cmr-field-type>
            </cmr-field>                                              } 710
            <ejb-filter>
                <ejb-ql>
                    Employee.sex = 'M'   } 720
                </ejb-ql>
            </ejb-filter>
        </ejb-relationship-role>
    </ejb-relation>
</relationships>
```

```
SELECT
        T1. EMPNO,
        T1. FIRSTNME,
        T1. MIDINIT,
        T1. LASTNAME,
        T1. PHONENO,
        T1. HIREDATE,
        T1. JOB,
        T1. EDLEVEL,
        T1. SEX,
        T1. BIRTHDATE,
        T1. SALARY,
        T1. BONUS,
        T1. COMM,
        T1. WORKDEPT
FROM
        EMPLOYEE T1
WHERE
        T1.WORKDEPT = ?
AND
        T1.SEX = 'M'
```

FIG. 9

```
<relationships>
  <ejb-relation>
    <ejb-relation-name>Employee_To_Department</ejb-relation-name>
    <ejb-relationship-role id="EJBRelationshipRole_1118073727887">
      <ejb-relationship-role-name>department</ejb-relationship-role-name>
      <multiplicity>Many</multiplicity>
      <relationship-role-source>
        <ejb-name>Employee</ejb-name>
      </relationship-role-source>
      <cmr-field>
        <cmr-field-name>department</cmr-field-name>
      </cmr-field>
    </ejb-relationship-role>
    <ejb-relationship-role id="EJBRelationshipRole_1118073727897">
      <ejb-relationship-role-name>employeesBySex</ejb-relationship-role-name>
      <multiplicity>One</multiplicity>
      <relationship-role-source>
        <ejb-name>Department</ejb-name>
      </relationship-role-source>
      <cmr-field>
        <cmr-field-name>employeesBySex</cmr-field-name>
        <cmr-field-type>java.util.Collection</cmr-field-type>
      </cmr-field>
      <ejb-filter>
        <method-params>java.lang.Character</method-params>
        <ejb-ql>
            Employee.sex = ?1
        </ejb-ql>
      </ejb-filter>
    </ejb-relationship-role>
  </ejb-relation>
</relationships>
```

910 brackets the second ejb-relationship-role block; 920 brackets the ejb-filter block.

SYSTEM FOR NAVIGATING BEANS USING FILTERS AND CONTAINER MANAGED RELATIONSHIPS

This application is a continuation of application Ser. No. 11/201,656, filed Aug. 11, 2005, status awaiting publication.

BACKGROUND OF THE INVENTION

1. Technical Field

The present invention relates generally to an improved data processing system and method. More specifically, the present invention is directed to a system and method for navigating beans using filters and container managed relationships.

2. Description of Related Art

Enterprise Java Beans (EJBs) are software components in Sun Microsystem's Java 2 Enterprise Edition (J2EE) platform, which are written as software modules that contain the business logic of an application. EJBs reside in, and are executed in, an EJB container, i.e. a runtime environment which provides common interfaces and services to the EJB.

There are three basic types of EJBs: session beans, entity beans, and message driven beans. Session EJBs are used to perform processing. Entity EJBs are used to represent data, which may be a row or a table in a database, for example. Message driven EJBs are generated to process Java Messaging Service (JMS) messages. EJBs may be used to implement tables and databases, for example, using entity EJBs to represent the elements in the tables and/or databases.

In generating applications for addressing business situations, often complex relationships between EJBs are required to accurately reflect real-world conditions. In the original Java specification, however, EJBs made such complex relationships more difficult to implement because developers had little control over when an EJB was activated or made passive. As a result, developers often were required to generate complex logic to ensure object persistence within these relationships.

Recognizing a problem with the original Java specification for EJBs, the EJB specification developers at Sun Microsystems have added container-managed relationships (CMR) in EJB specification 2.0 and 2.1 specification. With the original EJB specification 1.0 and later specification 1.1, container-managed fields were identified by placing attributes in the bean and describing the fields in the deployment descriptor. Although other entity beans could reside within a parent entity bean, the container did not automatically handle their persistence or loading. Therefore, the bean developer was required to write additional code to handle these additional entity beans.

With the EJB 2.0 and 2.1 specification, container-managed fields now have abstract getters and setters to identify them rather than attributes within the bean. The getters' return types depend upon the relationship's type. If a single child-bean instance is returned, the instance return type is the child bean's local interface. In contrast, if multiple child-bean instances return, the return type of the generated method is a java.util.Collection or a java.util.Set, however the contents of these collections are instances of the child-bean's local interface. The bean developer can then describe the relationship, defined within the deployment descriptor's relationship tag, in the EJB's deployment descriptor.

FIG. 1 is an example of a deployment descriptor for an EJB having a relationship tag, taken from "Container-Managed Relations for the 21st Century," by Allen Fogleson, Apr. 19, 2002 available from JavaWorld (www.javaworld.com). The example shown in FIG. 1 defines a user bean with a one-to-one, unidirectional relationship to a demographics bean.

The relationships tag tells the container that the user describes the relationships of the beans contained in this deployment. Each relationship starts with the ejb-relation tag. The ejb-relation-name tag is a human-readable description of the relationship. The ejb-relationship-role tags, of which there are two in each ejb-relation, describe each entity bean's role in this relationship. Each ejb-relationship-role tag contains a human-readable ejb-relationship-role-name tag and describes that bean's role in the relationship. The multiplicity tag describes whether the bean is on the relationship's one or many side. The relationship-role source contains an ejb-name tag, which is the entity bean that participates in the relationship. The ejb-name tag must match one of the EJBs defined in an EJB Java Archive (JAR) file.

The cmr-field tag is optional. If the described bean lacks a CMR field, it will not be included as demonstrated in the second ejb-relationship-role tag above. However, the cmr-field tag is required for beans that have a CMR field. The text within the tag contains the cmr-field-name tag describing the name of the CMR field to use in the relationship. Finally, the cascade-delete tag, included in the bean that is the relationship's child, tells the container that if the relationship's parent is deleted, the parent's children should also be deleted.

The EJB 2.0 and 2.1 specification's persistence scheme may be used to represent eight relationships: one-to-one unidirectional, one-to-one bidirectional, one-to-many unidirectional, one-to-many bidirectional, many-to-one unidirectional, many-to-one bidirectional, many-to-many unidirectional, and many-to-many bidirectional. In one-to-one unidirectional relationships, the parent bean references one child entity-bean instance. In one-to-one bidirectional relationships both the parent and child beans reference each other.

In one-to-many unidirectional relationships, the parent entity bean references many child entity beans, and the child entity beans mean little without the parent. In one-to-many bidirectional relationships, each bean in the relationship references every other bean. The parent bean has many child beans, and each child bean references its parent.

In many-to-one unidirectional relationships, many parent entity beans reference a single child entity bean. However, the child entity bean does not refer back to the parents. Although many-to-one bidirectional relationships can easily be modeled under the EJB 2.0 and 2.1 specification's persistence scheme, they are not really unique relationships because they are identical to one-to-many bidirectional relationships.

In many-to-many unidirectional relationships, many parent beans reference many child beans. The child beans either mean nothing without the parent, or it is not necessary to look up a parent bean based on a child bean. In many-to-many bidirectional relationships, many parent beans reference many child beans, which likewise reference many parent beans.

The entity EJB models each relationship type using abstract accessors. The return type is either a local interface or a local interface collection. Since relationships use local interfaces that can work only within the same virtual machine, relationships cannot be created with other distributed entity beans. As a result, local interfaces are extremely fast. Because a remote call's overhead no longer exists, local interface calls act just like other local method calls to a regular Java class.

For more information about EJBs and container managed relationships, reference is made to the article "Container-Managed Relations for the 21st Century," by Allen Fogleson available from JavaWorld (www.javaworld.com), which provides examples and illustrations as to how the various types of relationships outlined above are generated using container managed relationship structures. In addition, information regarding how to generate such EJB container managed relationships using the WebSphere Studio™ development application, available from International Business Machines, Inc., may be obtained from "EJB Development Made Easy Using the UML Visualizer in WebSphere Studio," Daniel Berg, Oct. 6, 2004 (available from the IBM developerWorks website).

With the Container Managed Relationships available in the Java 2.0 and 2.1 specification, application developers can now design and encode complex relationships among many entity beans without resorting to custom logic in their entity-bean implementation class. Application developers may construct one-to-one, one-to-many, or many-to-many relationships without worrying about the entity bean's state. The container now ensures child beans properly persist, activate, and load.

While Container Managed Relationships (CMRs) provide a great advantage to application development over the prior Java 1.0 and 1.1 specifications, there are limitations to the power that CMRs provide. One limitation of CMRs arises in instances where one-to-many and many-to-many relationships occur. With such relationships, it is often necessary to retrieve a single result, rather than many results that would normally be retrieved using the one-to-many or many-to-many relationships.

As an example, assume that there are two container managed persistence (CMP) EJBs, department and employee, that have a one-to-many relationship, i.e. each department has many employees but each employee has only one department. Under the current CMP mechanism for defining a relationship, a developer can only define a relationship of the form getEmployees on the department EJB which will return all employees within the department. That is, with the current Container Managed Relationship mechanisms, a developer can only define simple relationships in which the main attributes are the entities involved, the multiplicity (cardinality) of each end of the relationship, and the role name of each end of the relationship. As a result, only large grain CMP operations are available through the CMR mechanisms.

To identify a particular employee, or group of employees, within the department, a developer would be required to define additional SELECT methods on the department EJB that contained the required EJB query language to navigate the relationship and restrict the employees returned within a WHERE predicate. Thus, developers are forced to write several SELECT methods to retrieve more specific data for each possible employee or employee group type, e.g., getMaleEmployees, getFemaleEmployees, getEmployeesOver60, etc., on the department EJB. In addition, developers must also write corresponding business methods that invoke the generated SELECT methods and promote the new business method to the local or remote interface so that it is accessible to clients of the EJBs. Therefore, much effort is placed on the developer to provide the necessary methods to provide fine grain navigation of relationships between EJBs.

In addition, problems arise with using Container Managed Relationships to handle insert only databases. That is, one common data warehousing technique is to make database tables insert only thereby reducing contention and improving performance. A side effect of this approach is that each table within the database defines a number of columns that are used in conjunction with the logical keys in order to uniquely identify an individual row. The most important column used in this manner is the insert timestamp column. The insert timestamp columns only have meaning within the table in which they are defined and cannot be used as part of a foreign key in another table, since the insert timestamp for a row in one table may be different to the insert timestamp for a row in another table even when the rows contain data for related entities.

As a result, when using Container Managed Persistence (CMP) of Container Managed Relationships to model these tables, the insert timestamp column cannot be used as a key column for the beans because they would need to include it in any foreign key definitions that might be used to navigate relationships between EJBs. As stated above, these insert timestamp columns have no meaning outside their respective tables and thus, cannot be used as foreign keys and thus, cannot be used to perform Structured Query Language (SQL) join operations, i.e. operations to join entries in two or more tables together.

In addition, if the EJB does not define the insert timestamp column as a key field, the findByPrimaryKey method, used to find entries in a database based on their primary keys, will not return a single instance of the EJB but instead will return multiple instances. This is because entries are not deleted in an insert only data warehousing database. As entries are updated, the updated entry is added as an additional entry without overwriting or deleting the original entry. Therefore, there will be more than one entry that has the same primary key and thus, more than one entry will be returned.

Under the current EJB specification, returning multiple instances using the findByPrimaryKey method is not permitted. As a result, clients of the CMP EJB must be restricted from calling the findByPrimaryKey method. This causes a problem in that many advanced application features rely on methods that make use of the findByPrimaryKey method to perform their functions. For example, in the WebSphere™ integration and application infrastructure software available from International Business Machines, Inc., the Read Ahead Hints and Access Intents features may not be used by the EJB container due to the restriction against calling the findByPrimaryKey method.

SUMMARY OF THE INVENTION

In view of the above, it would be beneficial to have a system and method for navigating container managed relationships between beans that permits the filtering of results generated by such navigation in order to obtain fine grain results. In addition, it would be beneficial to have a system and method that permits such navigation while enabling application functionalities that depend upon the use of logical keys to identify beans meeting certain criteria.

The present invention provides a system and method for navigating relationships between beans using filters and container managed relationships. With the system and method of the present invention, filters are specified in the relationship definition of a deployment descriptor of a bean. The filters remove the need to explicitly generate EJB SELECT methods in order to obtain more fine grain results. The SQL SELECT statement that is generated based on these filters to navigate the container managed relationship has additional predicates generated on the WHERE clauses for navigating relationships, these additional predicates being generated based on the filters specified in the deployment descriptor. Moreover, these filters may be defined such that method parameters may be passed into the resulting deployed code to thereby make them more flexible. Thus, a more general filter may be defined in the deployment descriptor with specific implementations of the filter being implemented based on the passed in method parameter.

Therefore, with the present invention, rather than defining filters programmatically in methods of a bean's implementation class, filters are defined declaratively in the deployment descriptor of the bean as part of a Container Managed Relationship definition. Since these filters are specified in the deployment descriptor of the bean, they are accessible to clients of the bean through the local interface. That is, the filters of the present invention are part of the container managed relationship (CMR) definition within the deployment descriptor. CMRs can only be defined between entity beans that expose local interfaces. Therefore, the accessor method that is used to navigate the relationship (with the filter of the present invention applied) can be exposed on the local interface of the entity bean. As a result, developers need not generate additional code to implement filters for each conceivable type of entity bean or group of entity beans that may be requested by a client method.

In one exemplary embodiment of the present invention, a method, computer program product, and apparatus are provided in which a relationship between at least two beans is defined in a deployment descriptor. A filter may also be defined, in the deployment descriptor, which operates on the relationship between the at least two beans. The at least two beans may be deployed based on the deployment descriptor, wherein at least one method is generated during deployment that implements the filter defined in the deployment descriptor.

The beans may be, for example, entity Enterprise Java Beans (EJBs) and the relationship may be a Container Managed Relationship (CMR). In such a case, the relationship may be defined in the CMR definition of the deployment descriptor for the entity EJBs.

Defining a filter on the relationship may comprise providing a filter tag in the deployment descriptor identifying a portion of the deployment descriptor as being associated with the filter. In addition, a filter definition may be provided in association with the filter tag, wherein the filter definition includes one or more attributes that are a subject of the filter. The filter definition may include a designation of one or more parameters that may be passed into the filter to control the operation of the filter. The one or more parameters may comprise a logical operator parameter identifying a logical operator parameter to be applied to one or more predicates generated based on the filter definition. Moreover, the at least one method that implements the filter may comprise a query language statement having a WHERE clause and the one or more predicates may be combined with the WHERE clause using the logical operator parameter.

The at least one method that implements the filter may comprise a query language statement in which a WHERE clause of the query language statement is augmented to include one or more predicates generated based on the defined filter. The query language statement may be a Structured Query Language (SQL) SELECT statement, for example.

The at least one method that implements the filter may be, for example, an abstract method that may be called by EJB clients. The at least one method may also be a SELECT method.

Deploying the beans based on the deployment descriptor may comprise generating a query language statement based on the defined relationship and interpreting the defined filter in the deployment descriptor to generate one or more predicates. The one or more predicates may be applied to the generated query language statement.

In one exemplary embodiment, the apparatus may comprise a processor and a memory coupled to the processor, wherein the memory includes instructions executable by the processor. The instructions may be executed by the processor to define a relationship between the at least two beans in a deployment descriptor, define, in the deployment descriptor, a filter on the relationship between the at least two beans, and deploy the at least two beans based on the deployment descriptor. At least one method may be generated during deployment that implements the filter defined in the deployment descriptor. Similarly, a computer program product may be provided that provides a computer readable program that, when executed in a computing device, causes the computing device to perform operations to implement the functions described previously.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is an example of a deployment descriptor for an EJB having a relationship tag;

FIG. 4B is an example of the SQL code that is generated based on the deployment descriptor shown in FIG. 4A;

FIG. 5 is an exemplary diagram of a finder method that may be used to return a particular group of EJB instances matching a predetermined criteria;

FIG. 6 is an exemplary diagram of a select method that may be used to return a particular group of EJB instances matching a predetermined criteria;

FIG. 7 is an exemplary diagram illustrating a filter within a relationship definition of an EJB deployment descriptor in accordance with the present invention;

FIG. 9 is an exemplary diagram of an EJB filter tag in which method parameters may be passed to the resulting deployed code in accordance with an exemplary embodiment of the present invention;

DETAILED DESCRIPTION OF THE PREFERRED EMBODIMENTS

Figure 2:
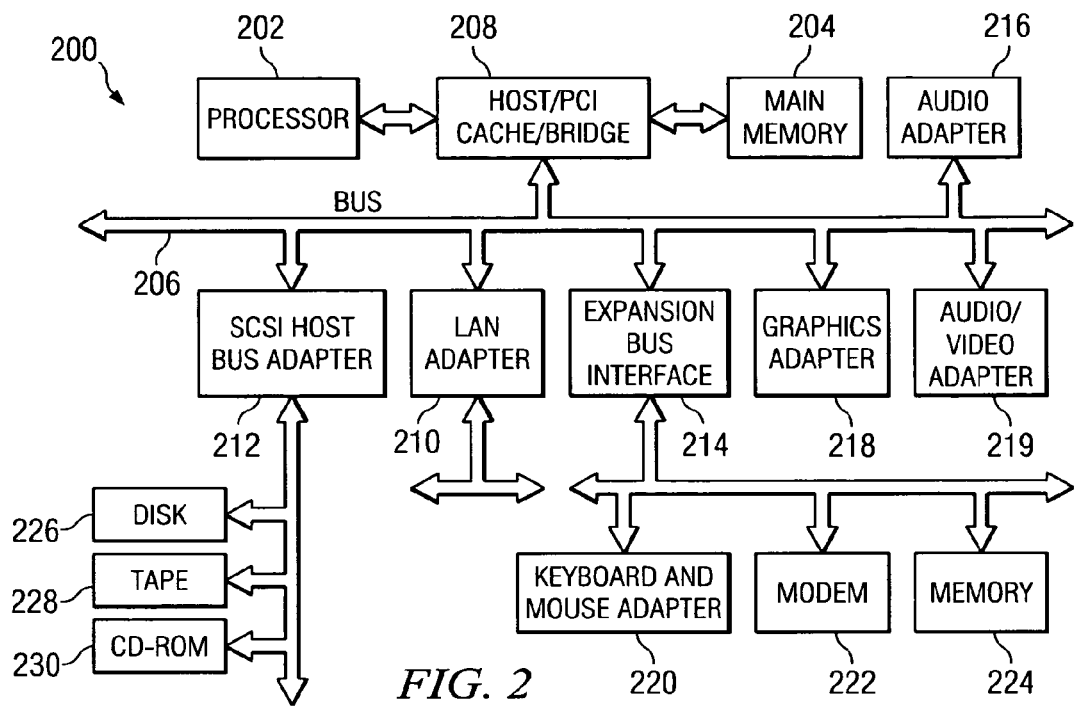
FIG. 2 is an exemplary block diagram of a data processing system in which aspects of the present invention may be implemented.

The present invention provides a system and method for defining filters in deployment descriptors of beans such that these filters may be used by clients of the beans without requiring complex coding in order for applications to make use of these filters. As such, the present invention is implemented in a data processing system, such as a client computing device, server computing device, a distributed computing system in which multiple computing devices are coupled to one another via one or more networks, and the like. FIG. 2 below is provided as one example of a data processing system in which aspects of the present invention may be implemented. It should be appreciated that the data processing system shown in FIG. 2 is only exemplary and is not intended to state or imply any limitation as to the types of, or architectural configuration of, computing devices in which the present invention may be implemented. Many modifications to the depicted example may be made without departing from the spirit and scope of the present invention.

With reference now to the figures, FIG. 2 is an exemplary block diagram of a data processing system in which aspects of the present invention may be implemented. Data processing system 200 is an example of a computer in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP™, which is available from Microsoft Corporation. An object oriented programming system, such as Java™, may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

As mentioned above, the present invention provides a mechanism, which may be implemented in a data processing device such as the computing device shown in FIG. 2, for enabling navigation of Container Managed Relationships of beans, such as Enterprise Java Beans (EJBs), using filters defined in deployment descriptors of the beans. Thus, in a preferred embodiment, the present invention is especially well suited for use with a Java™ environment, and more specifically, a Java™ environment as defined under the Java 2.1 specification. While the present invention will be described in terms of the structures defined in the Java 2.1 specification, it should be appreciated that the principles of the present invention apply to any object oriented environment in which beans and Container Managed Relationships (CMR) having Container Managed Persistence (CMP) are utilized. Thus, for example, should additional Java specifications be developed that continue to use the bean, CMR and CMP structures, such Java environments are intended to be within the spirit and scope of the present invention.

With the present invention, a user creates two or more beans, which for purposes of the present description will be assumed to be Enterprise Java Beans (EJBs), which are to be related through a Container Managed Relationship (CMR). The definition of these beans may be performed by hand, from a database schema, or other bean development tool, such as WebSphere Studio™, available from International Business Machines, Inc.

The relationship between the two or more EJBs is then defined in an EJB deployment descriptor. Again, this may be done by hand, from a database schema, or other development tool. The defining of EJBs and relationships between EJBs in deployment descriptors is generally known in the art and thus, a detailed explanation is not provided herein.

The user then defines one or more filters on the relationship between the two or more EJBs. The filter is added to the relationship definition in the EJB deployment descriptor using filter tags. For example, an <ejb-filter> tag may be used to designate the filter. Within the filter definition is a definition of the EJB attributes that are the subject of the filter, e.g., what attributes a method may search against in order to filter out unwanted EJBs or return only EJBs having the designated attribute. An accessor method for the relationship may be generated from the relationship definition as a whole with the filter being used to refine the SQL statement that is generated for the accessor method.

In addition, method parameters may be defined such that accessor methods generated based on the relationship definition may pass one or more parameters to designate how the filter is to operate, e.g., what value of the attribute is desired to be included in the filter's operation. Moreover, a logical operator may be specified in these parameters for identifying the logical operation that is to be applied by the filter to the resulting SQL statement, e.g., rather than the filter being "AND'd" to the end of a WHERE clause within the resulting SQL statement, a different logical operator may be specified.

Once the filter(s) are defined in the relationship definition of the deployment descriptor for the EJBs, the EJB code is generated through the deployment process. The deployment process of the present invention is similar to known deployment processes with the deployment tooling being updated to interpret the filters defined in the deployment descriptor to thereby generate additional predicates to the WHERE clause of the resulting SQL statements. As a result of the deployment process, abstract methods may be generated on the implementation class for implementing the filters defined in the deployment descriptor. These methods may then be called by clients of the EJBs to thereby retrieve fine grain filtered results.

By adding the ability to define a filter on a Container Managed Relationship in accordance with the present invention, developers are given the ability to declaratively define more specific relationships between EJBs than was previously permitted under known Container Managed Relationship mechanisms without the need to write additional complex code. Moreover, the problems associated with using unique attributes of EJBs that only have meaning within a particular context of the EJB, e.g., insert timestamp attributes in a data warehousing application, as primary keys is avoided by operation of the present invention since the unique attributes may be utilized in a declared filter in the deployment descriptor to perform fine grain filtering of results returned by CMR mechanisms.

The primary components of the present invention will be better understood with reference to particular example implementations of the present invention. FIGS. 3-9 provide particular examples for explaining one manner by which the present invention may be implemented. It should be appreciated that these figures are only exemplary and modifications to the depicted manner by which the present invention may be implemented may be made without departing from the spirit and scope of the present invention.

Figure 3A:
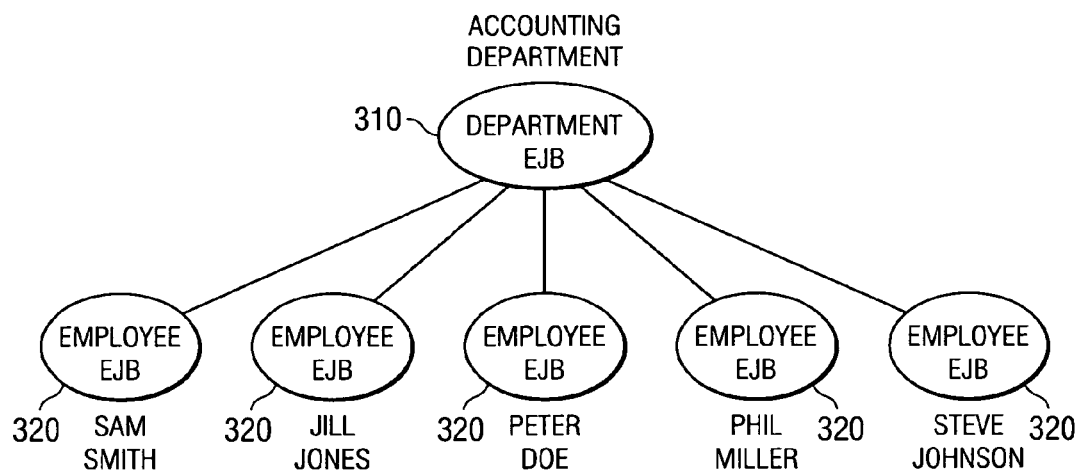
FIG. 3A is an exemplary diagram illustrating a one-to-many relationship used as a basis for explaining the inventive aspects of the present invention.

FIG. 3A is an exemplary diagram illustrating a one-to-many relationship used as a basis for explaining the inventive aspects of the present invention. As mentioned above, in order to implement the mechanisms of the present invention, a user must create at least two EJBs and define a relationship between the at least two EJBs. In the depicted example, a first EJB 310 represents a department within an organization. A second EJB 320 represent employees of the organization. A relationship between the department EJB 310 and the employee EJB 320 is defined as a one-to-many relationship because each department may have many employees, but each employee only belongs to one department.

It should be appreciated that, while the depicted examples will make reference to a one-to-many relationship between EJBs, the present invention is not limited to such. Rather, the present invention may also be applied to many-to-many Container Managed Relationships as well. Basically, the mechanisms of the present invention are applicable to any relationship in which one side of the relationship may involve a plurality of EJB instances such that a filter is required to return fine grain results.

Figure 3B:
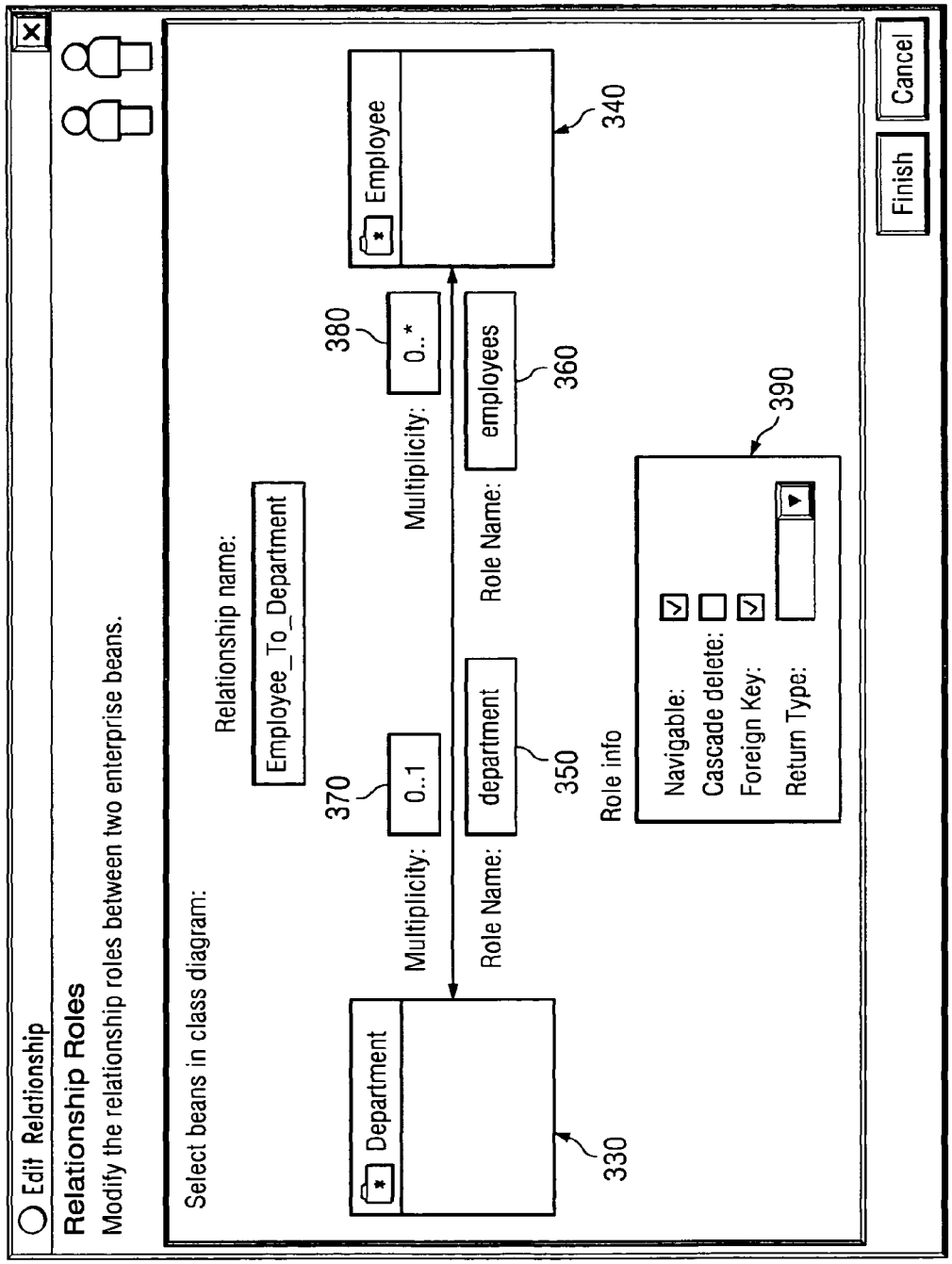
FIG. 3B is an exemplary diagram illustrating a user interface of one exemplary tool for defining a relationship between two EJBs in accordance with one exemplary embodiment of the present invention.

FIG. 3B is an exemplary diagram illustrating a user interface of one exemplary tool for defining a relationship between two EJBs in accordance with one exemplary embodiment of the present invention. As shown in FIG. 3B, a user may, after defining two or more EJBs, define a relationship between the two or more EJBs, such as Employee_To_Department, by selecting the EJBs in respective selection areas 330 and 340. The roles of each EJB are defined in the role name fields 350 and 360, the multiplicities are defined in fields 370 and 380, and role info is selected in field 390.

The particular example user interface shown in FIG. 3B is taken from the WebSphere Studio™ development tool available from International Business Machines, Inc. The example shown in FIG. 3B is only one example of a user interface of a tool that may be used to create relationships between EJBs. Other tools and user interfaces may be used without departing from the spirit and scope of the present invention.

Once a relationship is defined, such as by using the development tool shown in FIG. 3B, code is generated for defining the relationship between the EJBs in the EJB deployment descriptor. For example, this code may take the form of a mark up language coded file, such as an Extended Markup Language (XML) EJB deployment descriptor file, e.g., the ejb-jar.xml file. Such code may be automatically generated based on the relationship defined using the development tool, may be generated by hand, or the like.

There is only one deployment descriptor for each EJB module. Each EJB module may contain multiple EJBs that are all defined within the single deployment descriptor for that EJB module. CMRs can only be defined between EJBs in the same EJB module.

Figure 4A:
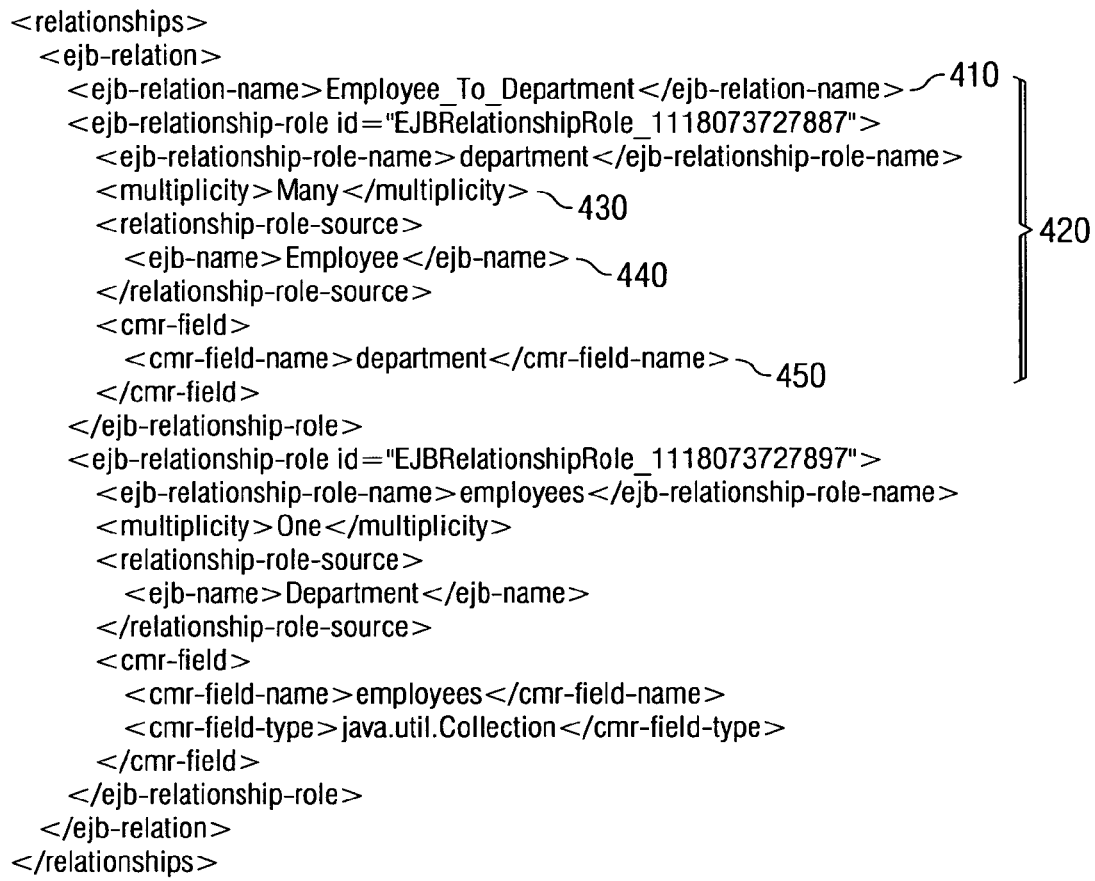
FIG. 4A is an exemplary diagram of relationship XML code written to an EJB deployment descriptor to define the relationship between the EJBs in the example shown in FIG. 3A.

FIG. 4A is an exemplary diagram of relationship XML code written to an EJB deployment descriptor to define the relationship between the EJBs in the example shown in FIG. 3A. As shown in FIG. 4A, there is code 410 for defining the name of the relationship, code 420 for defining a role within the relationship, code 430 for defining a corresponding multiplicity, code 440 for defining an EJB that is the source for the defined role, and optional cmr-field code 450 for specifying the name that will be used for the generated accessor method. Once the relationship has been defined as described above, methods that allow the relationship to be navigated are generated on each EJB's local interface. The relevant abstract methods are also defined within each EJB's abstract implementation class. The actual implementation of these methods is generated by the tooling when generating deployed code for each EJB.

However, the methods that are generated simply perform a join operation between the two EJB tables, e.g., departments and employees, based on the primary key/foreign key relationship defined. This implementation only allows developers to define coarse grained relationships between the EJBs. In the depicted example, the methods that are generated will only allow for the return of all of the employees that are in a particular department.

FIG. 4B is an example of the SQL code that is generated based on the deployment descriptor shown in FIG. 4A. The WHERE clause in the generated SQL code shown in FIG. 4B will simply return all of the employees for the specified department. This is a simple navigation of the relationship that exists between the Department and Employee EJBs and no further filtering of this relationship can be achieved using the CMR definition.

If a developer wants to define more fine grained relationships, such as methods that simply returned all of the male employees in a particular department, the developer must define additional methods on the EJBs in order to achieve this purpose. Two options are available for these additional methods, finder methods and select methods.

FIG. 5 is an exemplary diagram of a finder method that may be used to return a particular group of EJB instances matching a predetermined criteria. Finder methods are invoked by EJB clients in order to locate and obtain remote or local EJB object references to specific entity beans. Finder methods are always declared on the local home and/or remote home interfaces of an entity bean. Every home interface must define a findByPrimaryKey( ) method, which is a type of single-entity finder method.

As shown in FIG. 5, a finder method is defined on the local home or remote home interface of an EJB with a name of the form find<NAME>. The semantics for the finder method are defined by the EJB Query Language query string within the deployment descriptor for the EJB module as shown in FIG. 5.

The types that are returned by finder methods of an entity EJB are restricted by the EJB 2.1 specification to be that entity bean's local or remote interface, or a type representing a collection of objects that implement the entity bean's local or remote interface. This restriction means that finder methods defined on the local home or remote home of the department EJB can only return local or remote references to the department EJB. Thus, the finder methods are not suitable when attempting to define a fine grain relationship method, such as findMaleEmployees( ) method, since it would need to return local and remote references to employee EJBs.

Select methods are similar to finder methods, but they are more versatile and can only be used internally by the bean implementation class. In other words, select methods are private query methods and are not exposed to an EJB's clients through the home or remote interfaces.

Select methods are declared as abstract methods within the bean implementation class using the naming convention ejbSelect<METHOD-NAME>. Select methods can return the values of CMP fields or they can return several references to a bean by declaring a return type of java.util.Collection or java.util.Set. A select method that returns java.util.Set will not have duplicate values while a select method that returns java.util.Collection may return duplicate values. The semantics of a select method, like those of a finder method, are defined by an EJB Query Language query string within the deployment descriptor for the EJB.

Thus, a select method that traverses the department-employee relationship and returns only the male employees within a department could be defined with the deployment descriptor for the EJB module, as shown in FIG. 6. However, as stated above, the ejbSelectMaleEmployees( ) method is only defined within the bean implementation class. In its current form, it is not accessible to clients of the department EJB through either the local or remote interfaces. In order for the bean developer to expose this functionality to the client, the developer must implement an additional business method or local method that invokes the select method.

In other words, finder methods are not suitable for performing fine grain navigation of EJB Container Managed Relationships and select methods require additional methods to be generated to expose and utilize the select methods. In order for a developer to generate a fine grain relationship that returns only the male employees of a department using the previously described example CMR EJBs, the developer must perform the following steps:

(1) Define the EJBs;
(2) Define the CMR between the EJBs;
(3) Define a SELECT method on the Department EJB specifying the following EJB QL:
select object(1) from Department AS o,
in(o.employees) AS 1 where 1.sex='M';
(4) Define a business method on the Department EJB that invokes the SELECT method (since EJB SELECT methods can only be used internally by the EJB);
(5) Promote the new business method to the local interface so that it is accessible to clients of the EJB;
(6) Generate deployed code for the EJB module.

Thus, using the Department-Employee relationship as exemplary, the options currently available for defining relationships between EJBs are not suitable for performing fine grain navigation of Container Managed Relationships. Container Managed Relationships, as they are currently defined, only allow for the definition of coarse grained methods, such as getEmployees( ), that return all of the employees for a given department. Finder methods can only return references to the department EJB instances, not employee EJB instances as required. Select methods require the definition of additional EJB Query Language statements to traverse the relationship and filter the results. In addition, select methods can only be invoked internally by the bean implementation class and thus, their use by EJB clients requires the implementation of additional methods to expose them to the EBJ clients.

The present invention addresses this problem with the currently available options by providing a filter on the relationship between the EJBs. In the previously discussed example, this filter restricts the employees returned when traversing the relationship to just those that are male. The filter may be used when generating the deployed code for the EJB in order to append a suitable predicate on the WHERE clause in the generated SQL. The deployment process still generates the relevant get method on the component interface of the EJB so that EJB clients may invoke the method.

FIG. 7 is an exemplary diagram illustrating a filter within a relationship definition of an EJB deployment descriptor in accordance with the present invention. As shown in FIG. 7, the relationship definition is similar to the relationship definition illustrated in FIG. 4A, with the exception of section 710. Section 710 references a maleEmployees relationship role that is defined within the deployment descriptor having a multiplicity of one, a role source being the Department EJB, and a cmr-field employees having cmr-field-type of java.util.Collection.

Within this relationship role of the deployment descriptor is filter definition 720. The filter definition 720 includes an EJB filter tag <ejb-filter> for identifying the filter within the maleEmployees relationship role deployment descriptor. Within the EJB filter tag is an EJB Query Language tag <ejb-ql> identifying a query language statement, such as Employee.sex='M', as shown. The depicted query language statement defines a filter on the relationship between the Department EJBs and Employee EJBs that causes only the male employees of a given department to be returned.

Similar to the relationship definition described above with regard to FIGS. 3A and 3B, a similar user interface may be provided in which one or more filters may be designated for the defined relationship. For example, fields may be provided for defining the relationship role, the multiplicity for the relationship role, the relationship role source, and the filter applied to the relationship role, including fields for defining the attribute and corresponding value, if any, for the attribute.

Figures 8, 10:
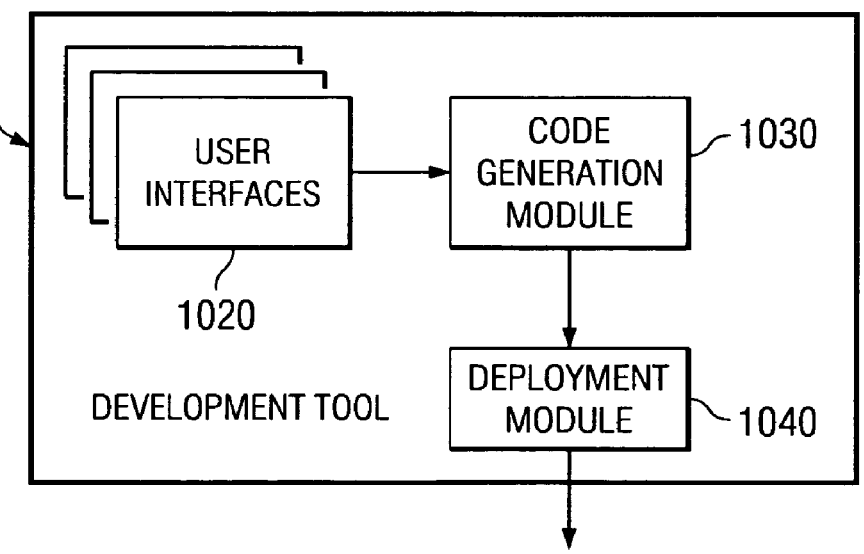
FIG. 8 is an exemplary diagram illustrating an SQL SELECT statement generated based on the filter defined in the deployment descriptor shown in FIG. 6.
FIG. 10 is an exemplary diagram of the primary operational components of a system implementing the filter mechanisms of the present invention.

FIG. 8 is an exemplary diagram illustrating a SQL SELECT statement generated based on the filter defined in the deployment descriptor shown in FIG. 7. As shown in FIG. 8, the generated SQL SELECT statement in FIG. 8 is similar to that shown in FIG. 4B. One major difference in the generated SQL SELECT statement is the inclusion of the predicate "AND T1.SEX='M'" in the WHERE clause of the SELECT statement. This predicate is generated based on the filter definition set forth in the deployment descriptor. Because of this predicate, the result of the SQL SELECT statement is that only those employees that are in a given department and that are male will be returned.

The resulting getMaleEmployees( ) method that is generated on the local interface of the EJB may cause this generated SQL to be executed. Thus, by calling the getMaleEmployees( ) method, an EJB client may obtain only the male employees within the department.

The above exemplary embodiments of the present invention describe embodiments in which the query language statement within the filter definition identifies the value of the attribute that is the basis for the filtering being performed. In many instances, it may be desirable to provide a more general and more flexible filter that permits the filter to be used with different values for an attribute. For example, it may be desirable to define a filter that may be used to return all male employees of a department in one implementation, and then all female employees of a department in another implementation.

With the above embodiments, a separate filter would need to be defined for each possible attribute value. In another exemplary embodiment of the present invention, as described hereafter, the filters of the present invention may be defined in the deployment descriptor so as to permit the passing of a method attribute value into the resulting deployed code. This attribute value may then be used to specify a value of the attribute upon which the filter acts. Thus, for example, a user may pass in a value of 'M' or 'F' to the same deployed code to obtain an operation of a filter to either obtain all male employees of a department or all female employees of a department, respectively.

Moreover, in another exemplary embodiment of the present invention, the filters of the present invention may be defined in the deployment descriptor so as to permit the passing of a logical operator attribute value into the resulting deployed code. The logical operator attribute value would define the manner by which the filter is to be used in conjunction with the other parts of the resulting SQL statement, i.e. how the predicates are logically connected with the WHERE clause of the resulting SQL SELECT statement. While a default value for the logical operator attribute value may be assumed to be "AND," in this exemplary embodiment, other logical operators, such as "OR," "NOT," and the like may be designated.

FIG. 9 is an exemplary diagram of an EJB filter tag in which method parameters may be passed to the resulting deployed code in accordance with an exemplary embodiment of the present invention. As shown in FIG. 9, a relationship role definition 910 for "employeesBySex" is provided in a similar manner as the relationship role "maleEmployees" in FIG. 7 was provided. The filter definition 920 in the relationship role definition "employeesBySex" of the deployment descriptor includes a "<method-params>" tag identifying the parameter types that may be passed into the resulting deployed code by a calling method. In the depicted example, a character parameter type, such as "M" or "F", may be passed into the deployed code. The query language for the filter then designates the attribute as Employee.sex and having a value that is passed into the deployed code.

The resulting getEmployeesBySex(java.lang.Character sex) method would then pass a value for Employee.sex into the SQL SELECT statement that is executed by the method which causes only the employee EJBs having a matching Employee.sex attribute value to be returned. Hence, one filter definition may be used to permit multiple different types of filters to be implemented in the deployed code.

Thus, using the mechanisms of the present invention, filters may be defined in a declarative manner within the relationship definition of a deployment descriptor of CMR EJBs. By adding the ability to define a filter on a CMR, developers are given the ability to define more specific relationships between EJBs without the need to write additional code. For example, using the mechanisms of the present invention, rather than going through the 6 steps described above to navigating a fine grain relationship between EJBs, the following steps may be performed to obtain a fine grain relationship between EJBs:

(1) Define the EJBs;
(2) Define the CMR between the EJBs;
(3) Define the filter within the CMR; and
(4) Generate Deployed Code for the EJB module.

Thus, the need to define a SELECT method on the EJB for each fine grain relationship, define a business method on the EJB that invokes the SELECT method for each fine grain relationship, and promote the new business method(s) to the local interface so that it is accessible to clients of the EJB, is eliminated by the mechanisms of the present invention. The net result of the ability to define the filter in the deployment descriptor is that the development time can be significantly reduced due to the fact that there is no longer a need to define the EJB SELECT and business methods.

In addition, the mechanisms of the present invention may lead to better performance at runtime where technologies are used to pre-fetch data using CMRs defined on an EJB, such as the Application Profiling and Read Ahead Hints features of the WebSphere Application Servers. The fine grained nature of the relationship filter would result in less data being retrieved from the database when a pre-fetch occurs, thereby saving execution time on the database and network time.

The mechanisms of the present invention may be applied to the insert only tables of a data warehousing application, such as the data warehousing application described in the Background of the Invention section above. That is, the filter mechanisms of the present invention may define a filter in the deployment descriptor of an EJB module in which two or more tables of the database have the relationships between the EJBs managed by Container Managed Relationships and Container Managed Persistence.

The filter may designate that the most recent timestamp entry is to be returned, for example. Thus, even though the insert timestamp attribute cannot be used as a primary or foreign key, it may be used in an attribute of a filter defined by the present invention. A method may then be generated to get an entry having the most recent timestamp with the filter operating to return a single entry having the most recent timestamp. Therefore, even if there are multiple entries that would usually be returned, the additional filter of the present invention limits the returned results to the most recently generated entry. Thus, even though the tables may be designated as insert only, rather than returning every instance of an entry from the database tables, the present invention provides a mechanism for retrieving only the most recent matching entry in the tables of the database.

FIG. 10 is an exemplary diagram of the primary operational components of a system implementing the filter mechanisms of the present invention. As shown in FIG. 10, a development tool 1010 is provided with user interfaces 1020 for defining EJBs, relationships between EJBs, and filters on relationships between EJBs. The development tool 1010 further includes a code generation module 1030 that generates the markup language code for implementing the defined EJBs, relationships, and filters. In particular to the present invention, the code generation module 1030 generates a deployment descriptor for an EJB module in which the identified filters are included as filter definitions within the deployment descriptor.

The generated markup language code is then deployed by deployment module 1040. The deployment module 1040 converts the markup language code to a query language which may be executed when corresponding methods are called. The deployed code is then provided for use by an application.

Figure 11:
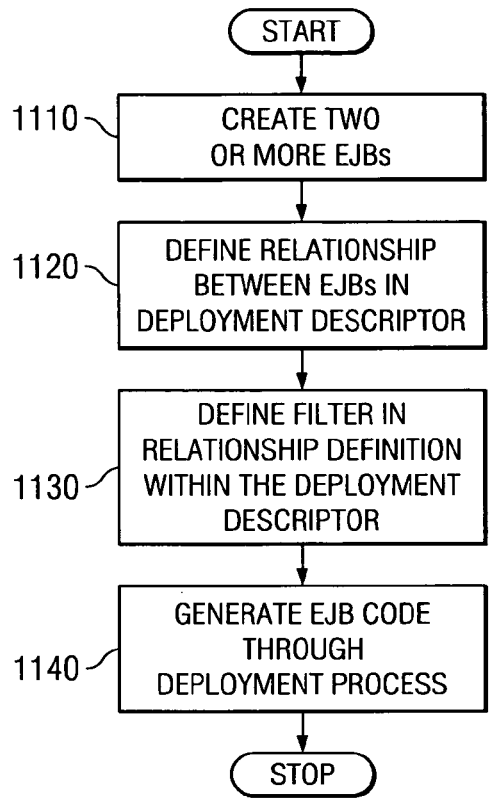
FIG. 11 is a flowchart outlining an exemplary operation of the present invention when deploying an EJB using the filter mechanisms of the present invention.

FIG. 11 is a flowchart outlining an exemplary operation of the present invention when deploying an EJB using the filter mechanisms of the present invention. It will be understood that each block, and combination of blocks, of the flowchart illustration in FIG. 11, and the flowchart illustrations in subsequent figures described hereafter, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

As shown in FIG. 11, the operation starts by creating at least two EJBs (step 1110) such as by way of a development tool, using a database schema, or by hand, for example. The relationship between the EJBs is then defined in the EJB deployment descriptor (step 1120). The filter is then defined within the relationship definition of the deployment descriptor (step 1130). A deployment process is then performed to thereby generate EJB code and methods corresponding to the relationship roles associated with the defined filter (step 1140). The operation then ends.

Figure 12:
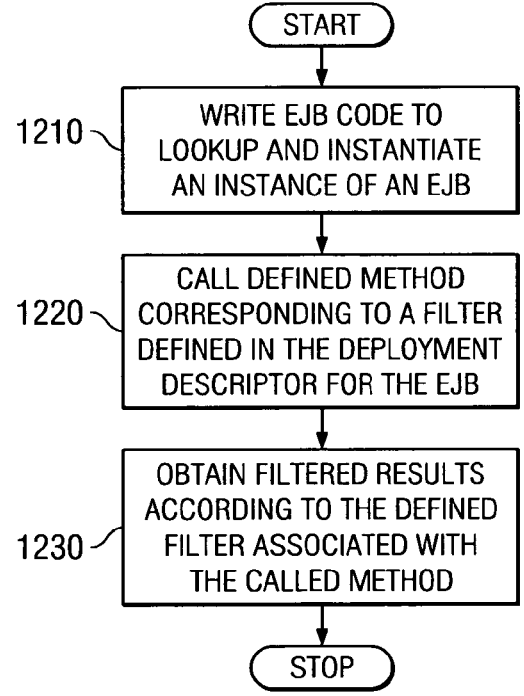
FIG. 12 is a flowchart outlining an exemplary operation of the present invention when a client of an EJB having a filter mechanism in accordance with the present invention calls a method generated based on the filter mechanism of the present invention.

FIG. 12 is a flowchart outlining an exemplary operation of the present invention when a client of an EJB having a filter mechanism in accordance with the present invention calls a method generated based on the filter mechanism of the present invention. As shown in FIG. 12, the operation starts by writing EJB client code to lookup and instantiate an instance of an EJB (step 1210). A defined method corresponding to a filter defined in the deployment descriptor for the EJB is then called (step 1220). Filtered results are then obtained according to the defined filter associated with the called method (step 1230). The operation then ends.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitoy computer readable medium having a computer readable program stored therein, wherein the computer readable program, when executed on a computing device, causes the computing device to:

define a relationship between at least two beans in a deployment descriptor;

define, in the deployment descriptor, a filter on the relationship between the at least two beans, wherein the defined filter includes one or more attributes that are a subject of the filter, wherein the filter, when executed, returns one or more beans having the one or more attributes, wherein the filter is defined declaratively in the deployment descriptor of a definition of the relationship, wherein defining the filter declaratively in the deployment descriptor allows the filter to be accessible to clients of the definition of the relationship through a local interface such that the filter is exposed on the local interface of the definition of the relationship, wherein exposing the filter on the local interface negates a generation of additional code to implement filters for each conceivable type of entity bean or group of entity beans requested by a client method and allows the client method to be navigated using the defined filter, and wherein the computer readable program to define a filter on the relationship further includes computer readable program that causes the computing device to:
provide a filter tag in the deployment descriptor identifying a portion of the deployment descriptor as being associated with the filter; and
provide a filter definition in association with the filter tag, wherein the filter definition further includes a designation of one or more parameters that are to be passed into the filter to control the operation of the filter, wherein the one or more parameters comprises a logical operator parameter identifying a logical operator parameter to be applied to one or more predicates generated based on the filter definition, wherein at least one method that implements the filter includes a query language statement having a WHERE clause, and wherein
the one or more predicates are combined with the WHERE clause using the logical operator parameter; and
deploy the at least two beans based on the deployment descriptor, wherein at least one method is generated during deployment that implements the filter defined in the deployment descriptor.

2. The computer program product of claim 1, wherein the beans are entity Enterprise Java Beans (EJBs) and the relationship is a Container Managed Relationship (CMR), and wherein the relationship is defined in the CMR definition of the deployment descriptor for the entity EJBs.

3. The computer program product of claim 2, wherein the at least one method is an abstract method that are to be called by EJB clients.

4. The computer program product of claim 1, wherein the query language statement is a Structured Query Language (SQL) SELECT statement.

5. The computer program product of claim 1, wherein the at least one method is a SELECT method.

6. A system for deploying at least two beans, comprising:
a processor; and
a memory coupled to the processor, wherein the memory includes instructions executable by the processor to:
define a relationship between the at least two beans in a deployment descriptor;
define, in the deployment descriptor, a filter on the relationship between the at least two beans, wherein the defined filter includes one or more attributes that are a subject of the filter, wherein the filter, when executed, returns one or more beans having the one or more attributes, wherein the filter is defined declaratively in the deployment descriptor of a definition of the relationship, wherein defining the filter declaratively in the deployment descriptor allows the filter to be accessible to clients of the definition of the relationship through a local interface such that the filter is exposed on the local interface of the definition of the relationship, wherein exposing the filter on the local interface negates a generation of additional code to implement filters for each conceivable type of entity bean or group of entity beans requested by a client method and allows the client method to be navigated using the defined filter, and wherein the instructions to define a filter on the relationship further causes the processor to:
provide a filter tag in the deployment descriptor identifying a portion of the deployment descriptor as being associated with the filter; and
provide a filter definition in association with the filter tag, wherein the filter definition further includes a designation of one or more parameters that are to be passed into the filter to control the operation of the filter, wherein the one or more parameters comprises a logical operator parameter identifying a logical operator parameter to be applied to one or more predicates generated based on the filter definition, wherein at least one method that implements the filter includes a query language statement having a WHERE clause, and wherein the one or more predicates are combined with the WHERE clause using the logical operator parameter; and
deploy the at least two beans based on the deployment descriptor, wherein at least one method is generated during deployment that implements the filter defined in the deployment descriptor.

7. The system of claim 6, wherein the beans are entity Enterprise Java Beans (EJBs) and the relationship is a Container Managed Relationship (CMR), and wherein the relationship is defined in the CMR definition of the deployment descriptor for the entity EJBs.

8. The system of claim 7, wherein the at least one method is an abstract method that are to be called by EJB clients.

9. The system of claim 6, wherein the at least one method is a SELECT method.

10. The system of claim 6, wherein the query language statement is a Structured Query Language (SQL) SELECT statement.

* * * * *